United States Patent [19]

Goldenberg et al.

[11] Patent Number: 5,265,275
[45] Date of Patent: Nov. 23, 1993

[54] SELECTIVE CALL RECEIVER HAVING MOVEABLE BATTERY CONTACTS

[75] Inventors: Michael P. Goldenberg; Evencio Fernandez, both of Boynton Beach, Fla.

[73] Assignee: Motorola, Inc., Schaumburg, Ill.

[21] Appl. No.: 592,381

[22] Filed: Oct. 3, 1990

[51] Int. Cl.$^5$ .............................................. H04B 1/08
[52] U.S. Cl. .................................. 455/348; 455/349; 455/351; 361/814
[58] Field of Search ............... 455/38, 90, 128, 343, 455/347, 348, 349, 351; 361/422; 340/825.44

[56] References Cited

U.S. PATENT DOCUMENTS

| | | | |
|---|---|---|---|
| 3,105,938 | 10/1963 | Onnigian et al. | 455/128 |
| 3,763,434 | 10/1973 | Blesch et al. | 455/349 |
| 4,283,796 | 8/1981 | Hughes | 455/349 |
| 4,578,628 | 3/1986 | Siwiak | 455/349 |
| 4,641,370 | 2/1987 | Oyamada | 455/348 |
| 4,786,889 | 11/1988 | Hayasaka | 455/90 |
| 4,969,206 | 11/1990 | Desrochers | 455/348 |
| 4,972,508 | 11/1990 | King | 455/347 |

Primary Examiner—Reinhard J. Eisenzopf
Assistant Examiner—Andrew Faile
Attorney, Agent, or Firm—Daniel R. Collopy; William E. Koch; Thomas G. Berry

[57] ABSTRACT

A selective call receiver (12) comprises a receiver circuit (78) and first and second contacts (80, 82) each having a first end (84, 86) electrically coupled to the receiver circuit (78) and each having a second end (92, 94). The selective call receiver (12) further comprises a first housing portion (33) for partially enclosing at least the receiver circuit (78) and a second housing portion (34) having a region (36) formed therein for receiving a battery (76) having first and second terminals (96, 98). The second housing portion (34) is capable of occupying first and second portions relative to the first housing portion (33) to provide access to the region (36) in the first position and to enclose the region (36) within the first housing portion (33) in the second position. The second housing portion (34) comprises deflection surfaces (42, 44) formed within the region (36) for deflecting the second ends (92, 94) of the first and second contacts (80, 82) to respectively engage the first and second terminals (96, 98) when the second housing portion (34) is moved to the second position.

15 Claims, 3 Drawing Sheets

SELECTIVE CALL RECEIVER HAVING MOVEABLE BATTERY CONTACTS

FIELD OF THE INVENTION

This invention relates in general to the field of battery powered selective call receivers, and more particularly to a selective call receiver having moveable battery contacts.

BACKGROUND OF THE INVENTION

Battery powered devices such as selective call receivers (e.g., pagers) generally include a housing into which a battery is inserted. Such devices typically include electrical contacts for coupling the battery to an electrical circuit (such as a receiver circuit). Conventional battery housings typically have an aperture through which the battery is inserted and a battery housing cover (i.e., battery door), for covering the aperture and for electrically contacting the battery. Typically, when installed, batteries are retained by forces exerted directly from the contacts via an interference (friction) fit between the battery and the contacts.

Additionally, conventional battery compartments have generally been designed to be oversized relative to the battery to enable ordinary users to manually extract the battery. Oversized battery compartments are undesirable since modern design philosophies in microelectronics encourage the reduction of physical size. Therefore, conventional battery compartments are not in line with modern design trends relative to electronic devices.

Historically, conventional battery contact methods have often been overly complicated and/or prone to failure upon impact of the battery in the electronic device, when the device is dropped. Many attempts have been made to provide a simplified yet highly reliable battery contact scheme, but none have enabled the battery compartment to be reduced in size while allowing the battery to be readily accessible and removable by the user.

Furthermore, conventional housings for electrical devices typically comprise at least two interlocking portions (i.e. main housing and battery door), which are assembled using various fasteners (e.g., screws) or fastening methods (e.g., sonic staking). Fasteners, such as screws, increase labor and material costs of the electronic devices, which increases the final cost of the product. Conversely, fastening methods such as sonic staking reduce the initial labor and material costs, but prevent the housing from being readily opened for repair once assembled. Because the housing is deformed when staked together, many products are considered non-repairable and discarded when the product fails. Ultimately, with either fastening technique, the consumer pays additional costs for the device either initially, in repairs, or in replacing the product.

Thus, a need exists for an electronic device having battery contacts that allow the battery compartment's size to be reduced and the battery to be readily accessible to the user. The need further exists for an electronic device having battery contacts that are reliable upon impact of the device.

SUMMARY OF THE INVENTION

A selective call receiver comprises a receiver circuit and first and second contacts each having a first end electrically coupled to the receiver circuit and each having a second end. The selective call receiver further comprises a first housing portion for partially enclosing at least the receiver circuit and a second housing portion having a region formed therein for receiving an energy source having first and second terminals. The second housing portion is capable of occupying first and second positions relative to the first housing portion to provide access to the region in the first portion and the enclose the region within the first housing portion in the second position. The second housing portion comprises deflection surfaces formed within the region, wherein the deflection surfaces comprise first and second chamfered surfaces for inwardly displacing the second ends of the first and second contacts to respectively engage the first and second terminals when the second housing portion is moved to the second position.

DETAILED DESCRIPTION OF THE INVENTION

Figure 1:
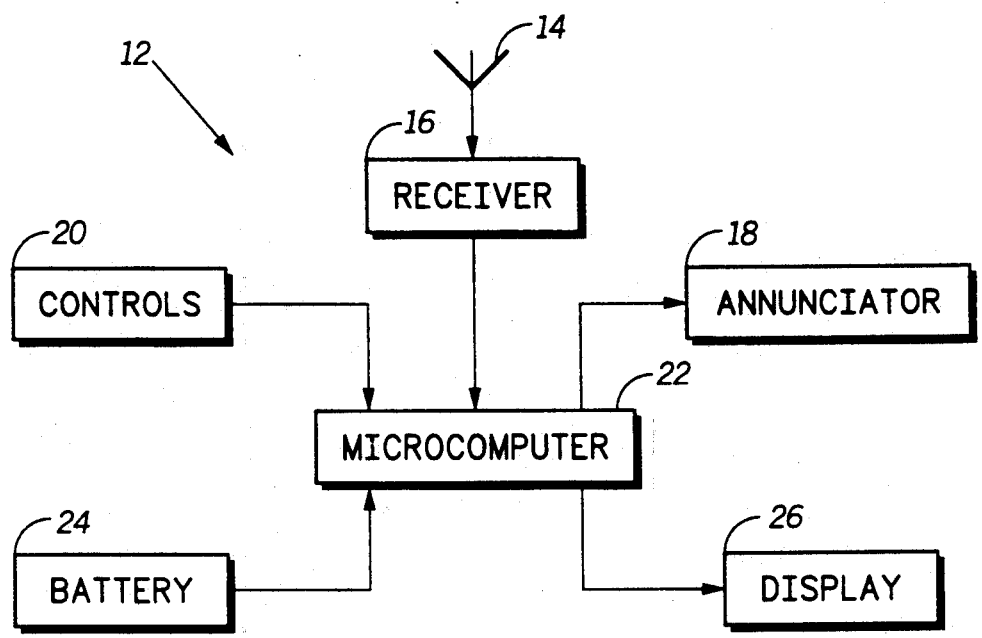
FIG. 1 is a block diagram of a selective call receiver suitable for operation of use with the present invention.

FIG. 1 is a block diagram of a selective call receiver (generally shown at 12), in which the preferred embodiment of the present invention may be implemented. The selective call receiver 12 includes an antenna 14 and a receiver 16 for generally receiving transmitted selective call messages and/or address information. The selective call receiver 12 also includes a microcomputer 22 coupled to an annunciator apparatus 18, a battery 24, a control apparatus 20 (e.g., on/off, volume control, and display control switches), and a display 26 for displaying message and control information as is well known to those skilled in the art. For a more detailed description of the structure and operation of a selective call radio paging receiver of the type shown in FIG. 1, reference is made to U.S. Pat. No. 4,518,961; U.S. Pat. No. 4,649,538; and U.S. Pat. No. 4,755,816; the teachings of which are hereby incorporated by reference.

Figure 2:
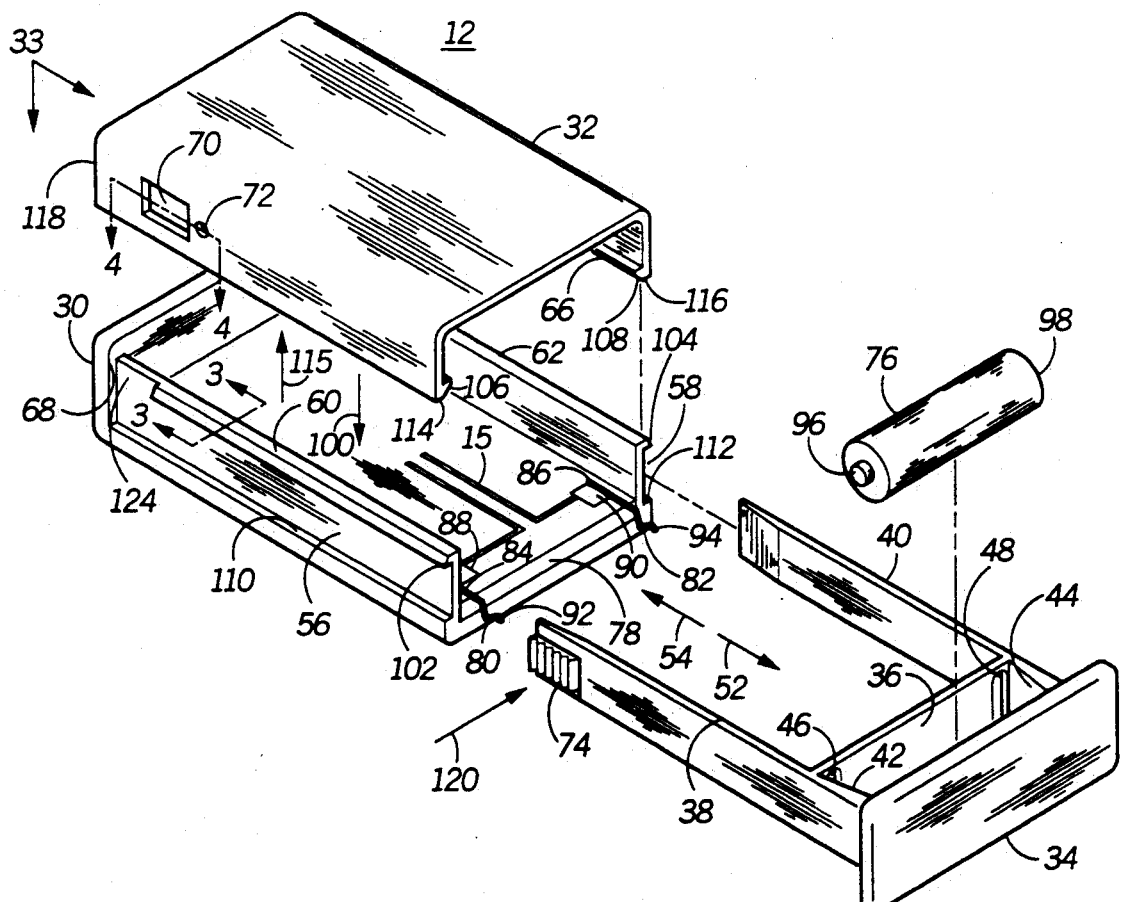
FIG. 2 is an exploded view of a selective call receiver in accordance with the present invention.
Figure 3:
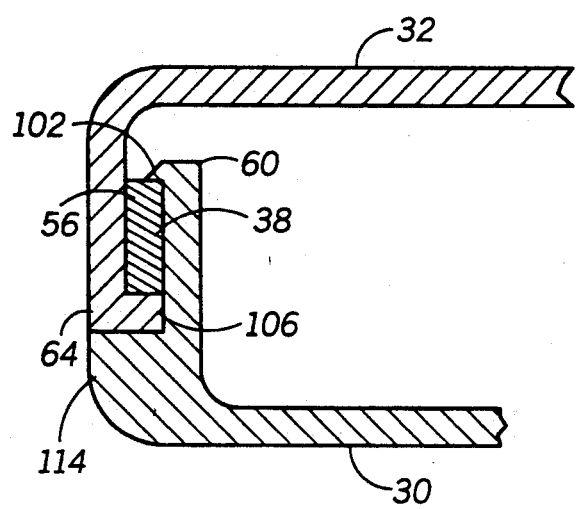
FIG. 3 is a cross sectional view taken along line 3—3 of FIG. 2.
Figure 4:
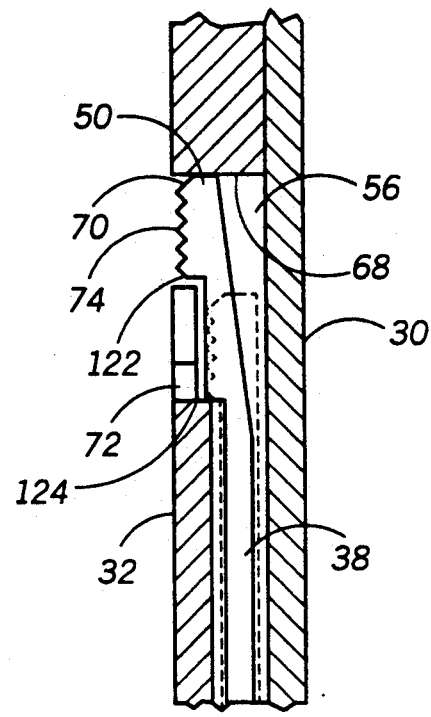
FIG. 4 is a cross sectional view taken along line 4—4 of FIG. 2.
Figure 5:
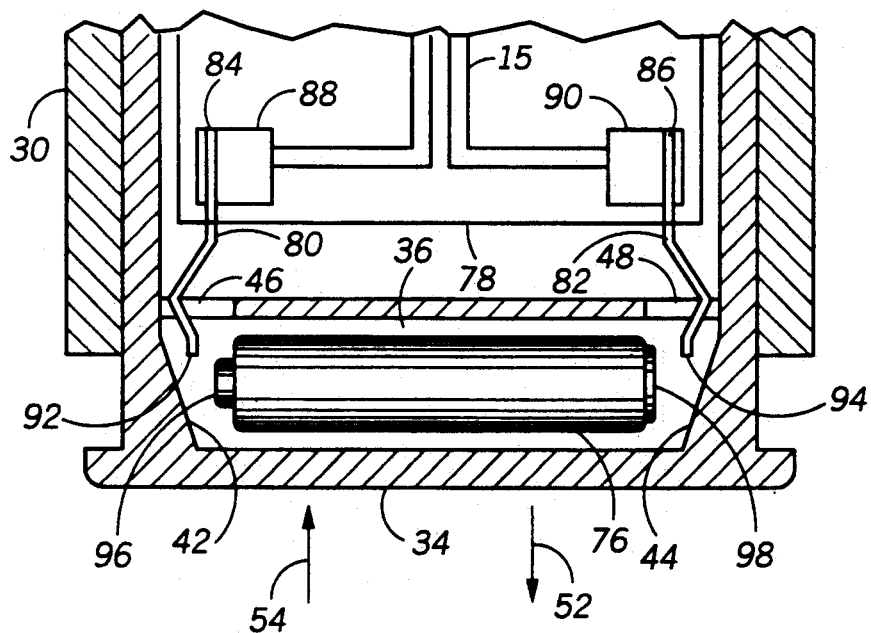
FIG. 5 is a top view of the battery region of the selective call receiver in a first position in accordance with the present invention.
Figure 6:
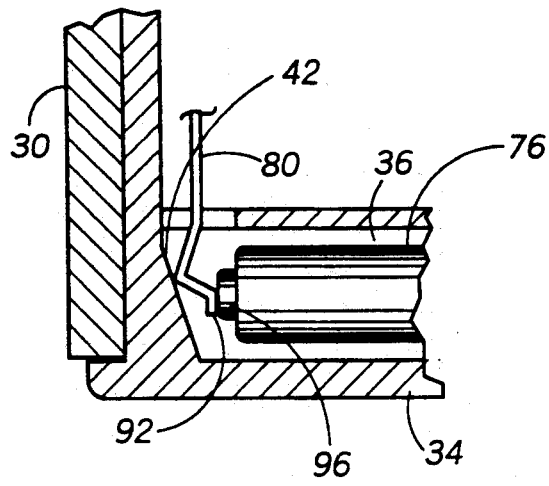
FIG. 6 is a top view of the battery region of the selective call receiver in a second position in accordance with the present invention.

Referring to FIGS. 2-4, the electronic device (e.g., selective call receiver) 12 is preferably housed using first and second housing portions 33 and 34, respectively. The first housing portion 33 preferably comprises first and second members 30 and 32. The first member 30 contains a printed circuit board 78, which comprises the necessary electrical circuitry 15 for the selective call receiver 12. The printed circuit board 78 may be positioned within the first or second members 30 or 32 (or both) without deviating from the intent of the invention. The printed circuit board 78 includes first and second electrical contacts 80 and 82 having first ends 84 and 86, respectively, and second ends 92 and 94, respectively. The first ends 84 and 86 of the first and second contacts 80 and 82, respectively, are electrically coupled to the printed circuit board 78 in a fixed position. Preferably, the first ends 84 and 86 are coupled via solder joints 88 and 90, respectively. However, the first ends 84 and 86 may be fixed using a variety of methods without deviating from the intent of the invention. The second ends 92 and 94 of the contacts 80 and 82, respectively, are substantially free to move relative to the first ends 84 and 86. In the preferred embodiment, as shown in FIGS. 5 and 6, the second ends 92 and 94 of the contacts 80 and 82 extend beyond the printed circuit board 78 to engage apertures 46 and 48, respectively, of the second housing portion 34 when the second housing portion 34 is moved to a first position (FIG. 6) that closes off a region 36 of the second housing portion 34 that receives an energy means (e.g., battery) 76. In this way, the second ends 92 and 94 of the contacts 80 and 82 enter region 36 within the second housing portion 34. The region 36 receives the battery 76, making the battery 76 readily accessible and removeable by the user when the region 36 is exposed, i.e., when the second housing portion 34 is moved into a second position, as shown in FIG. 5.

Returning to FIG. 2, the first member 30 includes first and second runners 60 and 62, respectively. Preferably, the first and second runners 60 and 62, respectively, include first and second chamfered (i.e. angled) surfaces 102 and 104, respectively. The second member 32 includes first and second runners 64 and 66, respectively. Preferably, the first and second runners 64 and 66, respectively, also include first and second chamfered surfaces 106 and 108, respectively. Referring next to FIG. 5, the chamfered surfaces 42 and 44 are utilized in the preferred embodiment to deflect (i.e., move) the second ends 92 and 94 of the contacts 80 and 82 to moveably engage the first and second terminals 96 and 98 of the battery 76; however, a variety of configurations may be utilized to deflect the second ends 92 and 94 of the contacts 80 and 82 such that they moveably engage the first and second terminals 96 and 98 of the battery 76 without deviating from the intent of the invention. During assembly, the second member 32 is positioned substantially above the first member 30 and moved in a direction 100, whereby runners 60 and 62 will substantially engage runners 64 and 66, respectively. In this way, the chamfered surfaces 102 and 104 of the first member 30 substantially engage chamfered surfaces 106 and 108 during assembly, thereby providing an optional interference fit that substantially retains the first and second members 30 and 32 as one unit (i.e., first housing portion 33). The interference fit prevents the first and second members 30 and 32 from becoming disengaged in a direction 115. However, the first and second members 30 and 32 may become disengaged in the direction 52. Of course, the first and second members 30 and 32 may be interlocked without use of an interference fit without deviating from the intent of the invention.

When assembled, the first and second members 30 and 32 (FIG. 1) are positioned such that surfaces 110 and 112 are substantially proximate to surfaces 114 and 116, respectively, and a surface 68 is substantially proximate to a surface 118, thereby creating channels 56 (FIG. 3) and 58 between the first and second members 30 and 32. The first and second arms 38 and 40 of the second housing portion 34 slideably engage the first and second channels 56 and 58 formed between the first and second members 30 and 32 in a direction 54. After the initial assembly, the first and second arms 38 and 40 rest in a position (FIG. 4) wherein an end 50 of the first arm 38 is substantially proximate to the surface 68 of the first member 30.

An optional locking feature (FIGS. 2 and 4) is provided by a tab 74, which is positioned substantially proximate the end 50 of the arm 38. The tab 74 engages an aperture 70 of the second member 32 (FIG. 4) as the arm 38 slideably engages the channel 56. After the tab 74 engages the aperture 70, the second housing portion 34 locks and secures (FIG. 3) the first and second members 30 and 32 in the second position (FIGS. 4 and 6). In this manner, the first housing portion 33, comprising the first and second members 30 and 32, is secured to the second housing portion 34 without the use of conventional fastening methods (e.g., screws, sonic staking, etc), thereby saving valuable manufacturing time and expense.

Referring to FIG. 5, the second housing portion 34 is illustrated after being slideably moved in a direction 52 into the first position to expose the region 36 for removal of the battery 76. Before the second housing portion 34 may be slideably moved, the tab 74 must be activated in a direction 120 (FIG. 2) whereby the tab 74 disengages the aperture 70. The tab 74 is then moved in a direction 52. A surface 122 of the tab 74 engages a surface 124 of the first member's (30) runner 60. In this manner, the second housing portion 34 is secured in the first position (FIG. 5). The second housing portion 34 may not be moved any farther in the direction 52, thereby preventing the second housing portion 34 from becoming completely disengaged from the first and second members 30 and 32. As described above, the second housing portion 34, while in both the first and second positions, secures the first and second members 30 and 32 such that the electronic device does not become disassembled.

In the first position (FIG. 5) the second ends 92 and 94 of the contacts 80 and 82 do not engage the positive or negative contact surfaces 96 and 98 of the battery 76. Therefore, the battery 76 may be removed by the user from region 36. However, as the second housing portion 34 is slideably moved in the direction 54, as shown in FIG. 6, the second ends 92 and 94 of the contacts 80 and 82 moveably engage the first and second chamfers 42 and 44, respectively. As the second ends 92 and 94 engage the chamfers 42 and 44, the chamfers inwardly deflect the second ends 92 and 94 such that the second ends 92 and 94 engage the positive and negative surface contacts 96 and 98 of the battery 76. Alternatively, the contacts 80 and 82 may be held in contact with the first and second terminals 96 and 98 without the use of the chamfers 42 and 44 without deviating from the intent of the invention. However, the use of the chamfers 42 and 44 allows the region 36 to be reduced to the virtual size of the battery 76, resulting in more efficient use of the selective call receiver's (12) internal space. Conventional battery compartments, on the other hand, are typically much larger than the size of the battery.

Another optional feature (FIGS. 2 and 4) is provided that enables the manufacturer or a licensed repairman to completely remove the second housing portion 34 for repairs. In the first position, wherein the surfaces 122 and 124 are engaged, the second housing portion 34 may not be moved any farther in the direction 52 by the user. However, a small instrument (not shown) may be inserted into an aperture 72 in the second member 32 to engage the tab 74. The tab 74 is then moved in a direction 120 such that the surfaces 122 and 124 are disengaged. At this point, the second housing portion 34 may be slideably moved in the direction 52, thereby completely removing the second housing portion 34 from the first and second members 30 and 32. The first and second members 30 and 32 will not fully separate in the direction 115 due to the interference fit between the runners 60 and 62 which engage the runners 64 and 66, respectively, during assembly.

Conventional battery contacts require that second ends of the battery contacts provide the compression force necessary to retain the battery. However, this results in more force being placed on the solder joints holding the battery contacts than in the preferred embodiment. In addition, the battery contacts in conventional devices may deflect upon dropping the selective call receiver, causing the battery to disengage from the battery contacts, thus interrupting the electrical connection to the circuitry. The preferred embodiment eliminates these problems by providing chamfered surfaces 42 and 44 that deflect the contacts 80 and 82, thereby providing a substantially constant force on the first and second terminals 96 and 98 of the battery 76. This substantially constant force provides virtually no additional stresses on the solder joints 88 and 90. Additionally, the contacts 80 and 82 will not be affected by deflection upon dropping the selective call receiver 12.

Figure 8:
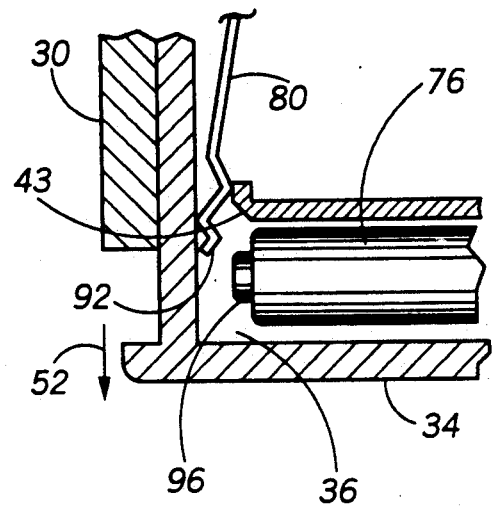
FIG. 8 is a top view of the battery region of the selective call receiver in a second position in an alternate embodiment of the present invention.
Figure 7:
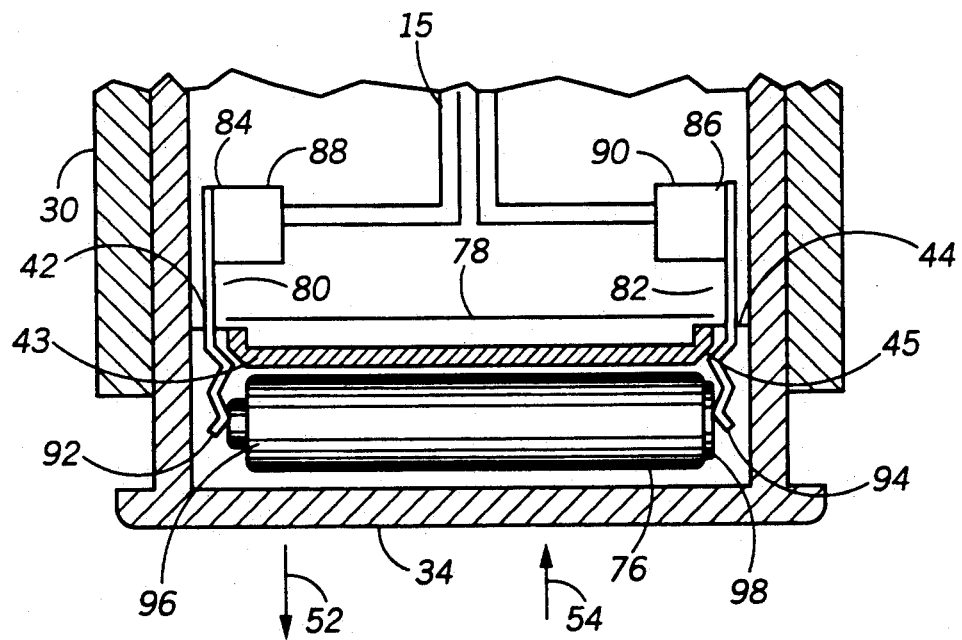
FIG. 7 is a top view of the battery region of the selective call receiver in a first position in an alternate embodiment of the present invention.

Referring to FIGS. 7 and 8, the second housing portion 34 is illustrated in an alternate embodiment of the present invention after being slideably moved in a direction 52 to expose the region 36 for removal of the battery 76 (FIG. 8). Before the second housing portion 34 may be slideably moved from the second position (FIG. 7), the tab 74 (FIG. 2 and 4) must be activated in a direction 120 so that the tab 74 disengages the aperture 70 in a similar manner to that described in conjunction with FIGS. 5 and 6. In the exposed position (FIG. 8), the second ends 92 and 94 of the contacts 80 and 82 are moved outward from the positive or negative contact surfaces 96 and 98 of the battery 76 by chamfers 43 and 45 of the second housing portion 34, thereby releasing the battery 76. Conversely, as the second housing portion 34 is slideably moved in the direction 54 (FIG. 7), the chamfers 43 and 45 become disengaged from the contacts 80 and 82 such that the second ends 92 and 94 of the contacts 80 and 82 moveably engage the positive and negative surface contacts 96 and 98 of the battery 76. Of course, the contacts 80 and 82 may be configured to maintain contact with the first and second terminals 96 and 98 without the use of the chamfers 42 and 44 without deviating from the intent of the invention.

We claim:

1. A selective call receiver, comprising:
  a receiver circuit;
  first and second contacts each having a first end electrically coupled to said receiver circuit and each having a second end;
  a first housing portion for partially enclosing at least said receiver circuit; and
  a second housing portion having a region formed therein for receiving an energy source having first and second terminals, the second housing portion capable of occupying first and second positions relative to said first housing portion to provide access to said region in said first position and to enclose said region within said first housing portion in said second position, wherein said second housing portion comprises deflection surfaces formed within said region, wherein said deflection surfaces comprise first and second chamfered surfaces for inwardly displacing said second ends of said first and second contacts to respectively engage said first and second terminals when said second housing portion is moved to said second position.

2. The selective call receiver according to claim 1 wherein, when said second housing portion is moved to said first position, said second ends of said first and second contacts disengage said first and second terminals.

3. The selective call receiver according to claim 1 wherein said first housing portion comprises:
  a first member for holding said receiver circuit;
  a second member; and
  locking means for interlocking said first and second members to form said first housing portion.

4. The selective call receiver according to claim 3 wherein said locking means comprises:
  a first locking feature formed along an edge of said first member; and
  a second locking feature formed along an edge of said second member, wherein, during assembly of said first and second members, a first chamfered surface of said first locking feature forcibly slides past a second chamfered surface of said second locking feature such that said first locking feature engages said second locking feature.

5. The selective call receiver according to claim 3 wherein said first member comprises at least one channel formed therein for receiving said second housing portion.

6. The selective call receiver according to claim 1 wherein said first and second terminals of said energy source are proximal to said first and second chamfered surfaces when said energy source is positioned within said region, said second ends of said first and second contacts extending through at least one aperture in said region and being inwardly displaced by said first and second chamfered surfaces when said second housing portion is in said second position, wherein said second ends of said first and second contacts engage said first and second terminals of said energy source and apply a substantially constant force thereto as a result of said first and second chamfered surfaces inwardly displacing said second ends of said first and second contacts.

7. The selective call receiver according to claim 6 wherein, when said second housing portion is moved to said first position, said second ends of said first and second contacts disengage said first and second terminals of said energy source to remove the substantially constant force applied thereto such that said energy source is removable from said region.

8. The selective call receiver according to claim 1 wherein said energy source comprises a battery.

9. The selective call receiver according to claim 5 wherein said second housing portion further comprises at least one arm having first and second ends, wherein said first end is coupled to said second housing portion and said second end is substantially free to move relative to said first end, said second end including at least one tab, and wherein said at least one arm slideably engages said at least one channel such that said tab engages an aperture in said first housing portion to secure said second housing portion to said first housing portion when said second housing portion is in said second position.

10. A selective call receiver, comprising:
a receiver circuit having first and second contacts coupled thereto, said first and second contacts having first and second ends, said first ends of said first and second contacts being secured to said receiver circuit and said second ends of said first and second contacts being substantially free to move relative to said first ends;
a first housing portion for partially enclosing at least said receiver circuit, said first housing portion having at least one channel formed therein; and
a second housing portion having a region formed therein for receiving a battery having first and second terminals, said second housing portion capable of moving between first and second positions relative to said first housing portion for providing access to said battery in said first position and for enclosing said region within said first housing portion in said second position, said second housing portion further comprising at least one arm having first and second ends, wherein said first end is coupled to said second housing portion and said second end is substantially free to move relative to said first end, said second end comprising at least one tab, said at least one arm engages said at least one channel such that said tab substantially engages an aperture in said first housing portion forming a locking means to secure said second housing portion to said first housing portion when said second housing portion is in said second position.

11. The selective call receiver according to claim 10 wherein said first housing portion comprises:
a first member for holding said receiver circuit;
a second member; and
locking means for interlocking said first and second members to form said first housing portion.

12. The selective call receiver according to claim 11 wherein said locking means comprises:
a first locking feature formed along an edge of said first member; and
a second locking feature formed along an edge of said second member, wherein, during assembly of said first and second members, a first chamfered surface of said first member forcibly slides past a second chamfered surface of said second member such that said first locking feature engages said second locking feature.

13. The selective call receiver according to claim 10 wherein said second housing portion further comprises deflection surfaces formed within said region for inwardly deflecting said second ends of said first and second contacts when said second housing portion is moved to said second position such that said second ends of said first and second contacts engage said first and second terminals of said battery.

14. The selective call receiver according to claim 13 wherein said second ends of said first and second contacts disengage said first and second terminals of said battery when said second housing portion is moved to said first position.

15. A selective call receiver, comprising:
a receiver circuit having first and second contacts coupled thereto, said first and second contacts having first and second ends, said first ends of said first and second contacts being secured to said receiver circuit and said second ends of said first and second contacts being substantially free to move relative to said first ends;
first and second interlocking housing members for partially enclosing at least said receiver circuit, said first and second members having at least one channel formed therebetween; and
a second housing portion for securing said first and second members, said second housing portion having a region formed therein for receiving a battery having first and second terminals, said region having first and second chamfered surfaces formed therein, said second housing portion capable of moving between first and second positions relative to said first and second members for providing access to said battery in said first position and for enclosing said region within said first and second members in said second position, said first and second terminals of said battery are proximal to said first and second chamfered surfaces when said battery is positioned within said region, said second ends of said first and second contacts extending through at least one aperture in said region and being inwardly displaced by said first and second chamfered surfaces when said second housing portion is in said second position, wherein said second ends of said first and second contacts engage said first and second terminals of said battery and apply a substantially constant force thereto as a result of said first and second chamfered surfaces inwardly displacing said second ends of said first and second contacts, said second housing portion further comprising at least one arm having a proximal end coupled to said second housing portion and a distal end which is substantially free to move relative to said proximal end, said distal end including at least one tab, wherein said at least one arm slideably engages said at least one channel such that said tab engages an aperture in said second member to secure said second housing portion to said first and second members when said second housing portion is in said second position.

* * * * *